(12) United States Patent
Sano

(10) Patent No.: US 8,867,150 B2
(45) Date of Patent: Oct. 21, 2014

(54) IMAGE PICKUP LENS

(75) Inventor: Eigo Sano, Tokyo (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 105 days.

(21) Appl. No.: 13/640,968

(22) PCT Filed: Apr. 12, 2011

(86) PCT No.: PCT/JP2011/059055
§ 371 (c)(1),
(2), (4) Date: Oct. 12, 2012

(87) PCT Pub. No.: WO2011/129319
PCT Pub. Date: Oct. 20, 2011

(65) Prior Publication Data
US 2013/0033637 A1    Feb. 7, 2013

(30) Foreign Application Priority Data

Apr. 13, 2010    (JP) .................................. 2010-092684

(51) Int. Cl.
*G02B 9/60* (2006.01)
(52) U.S. Cl.
USPC ............ 359/763; 359/714; 359/740; 359/764
(58) Field of Classification Search
USPC .................................. 359/714, 740, 763, 764
See application file for complete search history.

(56) References Cited

U.S. PATENT DOCUMENTS

| 8,441,743 | B2 * | 5/2013 | Ohtsu | 359/714 |
| 8,498,061 | B2 * | 7/2013 | Sano | 359/714 |
| 8,593,739 | B2 * | 11/2013 | Ise et al. | 359/714 |
| 8,599,496 | B2 * | 12/2013 | Ise et al. | 359/714 |
| 2011/0188131 | A1 * | 8/2011 | Sano | 359/714 |

FOREIGN PATENT DOCUMENTS

| JP | 2007-264180 | 10/2007 |
| JP | 2007-279282 | 10/2007 |
| JP | 2010-79296 | 4/2010 |
| JP | 2010-262269 | 11/2010 |
| JP | 2010-262270 | 11/2010 |
| JP | 2011-95513 | 5/2011 |
| WO | WO 2010/024198 | 3/2010 |

* cited by examiner

*Primary Examiner* — Evelyn A. Lester
(74) *Attorney, Agent, or Firm* — Cozen O'Connor

(57) ABSTRACT

To provide an image pickup lens with a five-lens configuration in which aberrations are corrected favorably despite its compactness. An image pickup lens 10 includes a first lens L1 having a positive refractive power and having a convex face directed to an object side, a second lens L2 of a meniscus shape having a negative refractive power and having a concave face directed to an image side, a third lens L3 having a positive refractive power, a fourth lens L4 having a positive refractive power and having a convex face directed to the image side, and a fifth lens L5 having a negative refractive power and having a concave face directed to the image side, in this order from the object side. Here, the focal length of the fifth lens, the focal length of the entire system of the image pickup lens, and an air separation on an optical axis between the fourth lens and the fifth lens satisfy predetermined conditions.

16 Claims, 12 Drawing Sheets

Spherical Aberration (mm)

Astigmatism (mm)

Distortion Aberration (mm)

Meridional Comatic Aberration

Spherical Aberration (mm)

Astigmatism (mm)

Distortion Aberration (mm)

Meridional Comatic Aberration

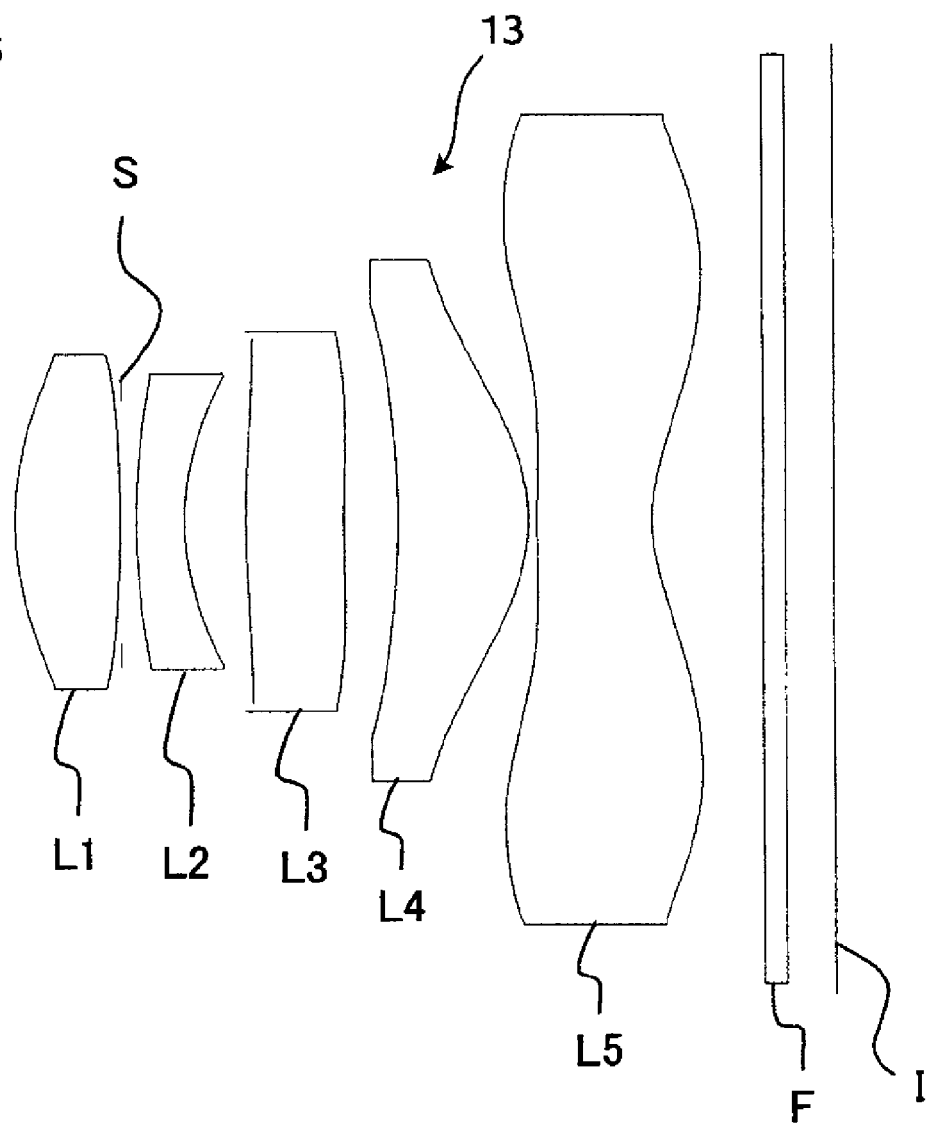

Spherical Aberration (mm)

Astigmatism (mm)

Distortion Aberration (mm)

Meridional Comatic Aberration

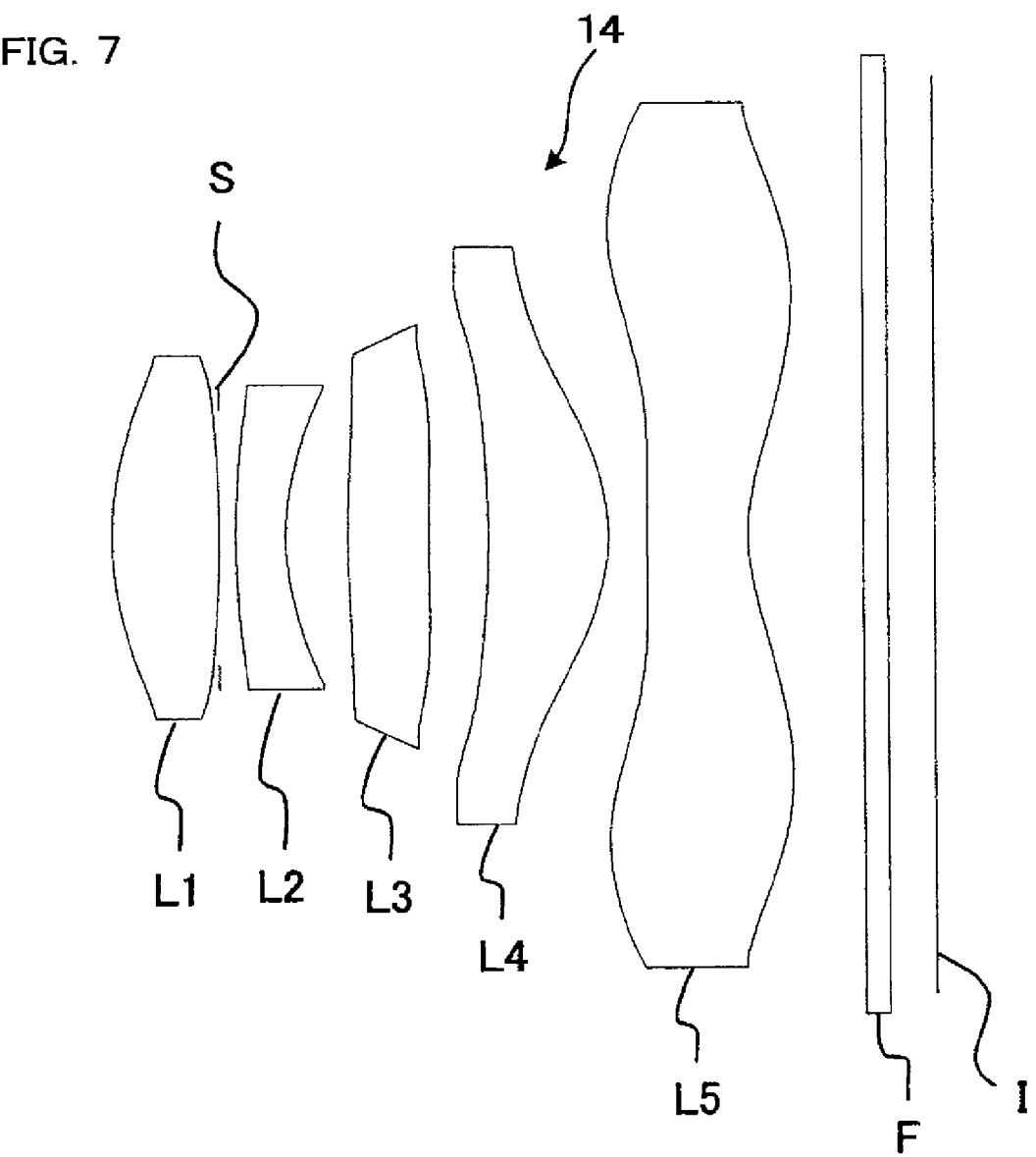

F=2.22

Spherical Aberration (mm)

Y=2.872

Astigmatism (mm)

Y=2.872

Distortion Aberration (mm)

Meridional Comatic Aberration

F=2.22

Spherical Aberration (mm)

Y=2.872

Astigmatism (mm)

Y=2.872

Distortion Aberration (mm)

Y=2.872 d-line
--- g-line

Y=1.436

Meridional Comatic Aberration

Spherical Aberration (mm)

Astigmatism (mm)

Distortion Aberration (mm)

Meridional Comatic Aberration

IMAGE PICKUP LENS

RELATED APPLICATIONS

This is a U.S. National Phase Application under 35 U.S.C. 371 of International Application PCT/JP2011/059055 filed on Apr. 12, 2011.

This application claims the priority of JP 2010-092684 filed Apr. 13, 2010, the entire content of which is hereby incorporated by reference.

TECHNICAL FIELD

The present invention relates to a compact image pickup lens being used with a solid-state image sensor, such as a CCD type image sensor and a CMOS type image sensor.

BACKGROUND ART

In recent years, accompanying the improvement in performance and reduction in size of an image pickup apparatus using a solid-state image sensor, such as a charge coupled device (CCD) type image sensor and a complementary metal oxide semiconductor (CMOS) type image sensor, mobile telephones and portable information terminals including such an image pickup apparatus are spreading. Further, an image pickup lens mounted in such an image pickup apparatus is demanded increasingly for further reduction in size and improvement in performance. As an image pickup lens intended for such a use, there has been proposed an image pickup lens having a configuration of five lenses because of the possibility of improvement in performance compared to a lens having a configuration of three or four lenses.

As an image pickup lens having a configuration of five lenses, an image pickup lens has been disclosed, which is configured by a first lens having a positive refractive power, a second lens having a negative refractive power, a third lens having a positive refractive power, a fourth lens having a negative refractive power, and a fifth lens having a negative refractive power in this order from an object side (for example, Patent Literature 1).

Further, an image pickup lens has been disclosed, which is configured by a first lens having a negative refractive power, a second lens having a positive refractive power, a third lens having a negative refractive power, a fourth lens having a positive refractive power, and a fifth lens having a negative refractive power in this order from the object side (for example, Patent Literature 2).

However, in the image pickup lens described in above Patent Literature 1, the first lens to the third lens contribute to most of the refractive power of the entire system and the fourth lens and the fifth lens have only the effect as an image plane correcting lens having a weak refractive power. Consequently, the image pickup lens of Patent Literature 1 has such a problem that aberration correction is insufficient and if the total length of the lens is reduced, it becomes difficult for the image pickup lens to cope with a larger number of pixels in the image sensor because of deterioration in performance.

Further, in the image pickup lens described in above Patent Literature 2, the former group configured by the first lens and the second lens includes a spherical surface system, and therefore, it is not possible to secure excellent performance because of insufficient correction of spherical aberration and comatic aberration. Furthermore, in the image pickup lens of Patent Literature 2, because not only the former group but also the latter group including the third lens and subsequent lenses has a configuration of the positive refractive power, the principal point position of the optical system is on the image side and the back focus (distance from the last lens surface to the image plane) is increased, and therefore, this is a type disadvantageous in downsizing.

CITATION LIST

Patent Literature

PTL 1: Japanese Patent Laid-Open No. 2007-264180
PTL 2: Japanese Patent Laid-Open No. 2007-279282

SUMMARY OF INVENTION

The present invention has been made in view of those problems, and an object thereof is to provide an image pickup lens having a configuration of five lenses whose aberrations are corrected favorably despite its compactness.

Here, about the scale of a compact image pickup lens, the present invention aims at the level of compactness that satisfies the following conditional expression (9), $$L/2Y<1.00 \quad (9)$$

where L is a distance on an optical axis from the lens surface nearest to the object side in the entire system of the image pickup lens to the focal point on the image side, and 2Y is the diagonal length of the image pickup surface of a solid-state image sensor (diagonal length of the rectangular effective pixel region of the solid-state image sensor). Here, the focal point on the image side refers to an image point when parallel rays parallel to the optical axis enter the image pickup lens. By satisfying this range, it is made possible to reduce the size and weight of the entire image pickup apparatus.

When an optical low pass filter, an infrared-cut filer, or a parallel flat plate such as a seal glass of a solid-state image sensor package, is disposed between the surface on the image side nearest to the image pickup lens and the image side focal point position, the value of L described above is calculated on the assumption that a space of the parallel flat plate part is regarded as an air-equivalent distance.

Further, more desirably, the present invention relates to an image pickup lens that satisfies the range specified by the following conditional expression (9'), $$L/2Y<0.90 \quad (9')$$

In order to solve the above-mentioned problems, an image pickup lens according to the present invention is a lens for forming an image of a subject on a photoelectric conversion part of a solid-state image sensor and includes, in order from an object side thereof: a first lens having a positive refractive power and having a convex surface directed to an object side; a second lens of a meniscus shape having a negative refractive power and having a concave surface directed to an image side; a third lens having a positive refractive power; a fourth lens having a positive refractive power and having a convex surface directed to the image side; and a fifth lens having a negative refractive power and having a concave surface directed to the image side. Here, the image side surface of the fifth lens has an aspheric shape and has an inflection point at a position other than the intersection with the optical axis. Further, the image pickup lens of the present invention satisfies the following conditional expressions (1) and (2), $$-0.8<f5/f<-0.4 \quad (1)$$

$$0<d45/f<0.07 \quad (2)$$

where f5 is the focal length of the fifth lens, f is the focal length of the entire system of the image pickup lens, and d45 is an air separation on the optical axis between the fourth lens and the fifth lens.

It is possible for the image pickup lens described above to have a so-called telephoto type lens configuration in which a positive lens group including the first lens, the second lens, the third lens, and the fourth lens in this order from the object side and the fifth negative lens are disposed. Such a lens configuration is advantageous in reducing the total length of the image pickup lens. Further, by using two negative lenses in the configuration of five lenses, it is made easy to correct the Petzval sum because the number of surfaces having a divergent effect is increased and it is made possible to obtain an image pickup lens that secures the excellent image quality even on the periphery of the picture plane or image area. Further, by forming the second lens into the shape of a meniscus, it is possible to dispose the composite principle point position of the entire system of the image pickup lens nearer to the object side to turn the image side surface of the second lens into a strong divergent surface, and therefore, it is made easy to correct the comatic aberration and distortion aberration. By forming the image side surface of the fifth lens disposed nearest to the image side into an aspherical surface, it is possible to favorably correct aberrations on the periphery of the picture plane or image area. Furthermore, by forming the image side surface of the fifth lens into the shape of an aspherical surface having an inflection point at a position other than the intersection with the optical axis, it is made easy to secure the telecentric characteristics of the image side rays. Here, an "inflection point" refers to a point on an aspherical surface at which the tangential plane or line at the vertex of the aspherical surface is perpendicular to the optical axis, and on a curve in the shape of a lens section within the effective radius.

The above-mentioned conditional expression (1) is a conditional expression for appropriately setting the focal length of the fifth lens and at the same time, for causing reduction in the total length of the image pickup lens and aberration correction to coexist. When the value of the conditional expression (1) is more than the lower limit, the refractive power of the fifth lens is prevented from becoming too strong and it is possible to reduce the total length of the image pickup lens, bringing an advantage in correcting aberrations. On the other hand, when the value of the conditional expression (1) is less than the upper limit, it is possible to maintain the refractive power of the fifth lens at an appropriate level and the back focus is prevented from becoming too long.

As to the above-mentioned conditional expression (2), when the value thereof is more than the lower limit, it is possible to prevent the fourth lens and the fifth lens from coming too close to each other and to secure a space into which a light blocking member to prevent stray light etc. is inserted. On the other hand, when the value of the above-mentioned conditional expression (2) is less than the upper limit, it is possible to dispose the fifth lens nearer to the object side, bringing an advantage in securing the back focus and in correcting the longitudinal chromatic aberration.

In a specific aspect of the present invention, the above-mentioned image pickup lens satisfies the following conditional expression (3), $$0.10 < f/f3 < 0.50 \qquad (3)$$

where f is the focal length of the entire system of the image pickup lens and f3 is the focal length of the third lens. The conditional expression (3) is a conditional expression for appropriately setting the focal length of the third lens, which is a positive lens, and for causing reduction in the total length of the image pickup lens and aberration correction to coexist. When the value of the conditional expression (3) is more than the lower limit, it is possible to maintain the refractive power of the third lens at an appropriate level, bringing an advantage in correcting aberrations. On the other hand, when the value of the conditional expression (3) is less than the upper limit, the refractive power of the third lens is prevented from becoming too strong and it is possible to reduce the total length of the image pickup lens.

Another aspect of the present invention satisfies the following conditional expression (4), $$0.45 < f34/f < 0.70 \qquad (4)$$

where f34 is a composite focal length of the third lens and the fourth lens and f is the focal length of the entire system of the image pickup lens. The conditional expression (4) is a conditional expression for appropriately setting the composite focal length of the third lens and the fourth lens in the range that satisfies the conditional expression (3) described above. When the value of the conditional expression (4) is more than the lower limit, the composite focal length of the third lens and the fourth lens is prevented from becoming too short and it is possible to dispose the principal point position of the entire system of the image pickup lens nearer to the object side, and therefore, it is possible to reduce the total length of the image pickup lens. Further, it is possible to suppress small the comatic aberration and curvature of field that is caused by the fourth lens. On the other hand, when the value of the conditional expression (4) is less than the upper limit, it is possible to maintain the composite refractive power of the third lens and the fourth lens at an appropriate level and it is made possible to smoothly guide the peripheral rays deflected toward the peripheral side by the second lens to the fifth lens, and therefore, it is made easy to secure the image side telecentric characteristics.

Still another aspect of the present invention satisfies the following conditional expression (5), $$-2.5 < f23/f < -1.3 \qquad (5)$$

where f23 is the composite focal length of the second lens and the third lens and f is the focal length of the entire system of the image pickup lens. The conditional expression (5) is a conditional expression for appropriately setting the composite focal length of the second lens and the third lens. When the value of the conditional expression (5) is less than the upper limit, the negative composite focal length of the second lens and the third lens is prevented from becoming too short less than necessary and it is possible to dispose the principal point position of the entire system of the image pickup lens nearer to the object side, and therefore, it is possible to reduce the total length of the image pickup lens. On the other hand, when the value of the conditional expression (5) is more than the lower limit, it is possible to maintain the negative refractive power of the second lens at an appropriate level and the third lens and to appropriately correct the chromatic aberration by the negative second lens and the positive third lens.

In still another aspect of the present invention, an aperture stop of the image pickup lens is disposed between the first lens and the second lens. In this case, the angle of refraction of the marginal rim ray that passes through the object side surface of the first lens is prevented from becoming too large and it is possible to cause downsizing of the image pickup lens and excellent aberration correction to coexist.

In still another aspect of the present invention, the image side surface of the second lens has an aspheric shape with which the negative refractive power is reduced at a position more distant from the optical axis toward the periphery. In this case, the ray is no longer deflected excessively toward the peripheral side and it is possible to secure excellent telecentric characteristics on the periphery after favorably correcting off-axis aberrations.

Still another aspect of the present invention satisfies the following conditional expression (6), $$15 < v2 < 31 \quad (6)$$

where v2 is the Abbe number of the second lens. The conditional expression (6) is a conditional expression for appropriately setting the Abbe number of the second lens. When the value of the conditional expression (6) is more than the lower limit, it is possible to appropriately increase dispersion of the second lens and to favorably correct chromatic aberrations, such as the longitudinal chromatic aberration and chromatic aberration of magnification, while suppressing the refractive power of the second lens. On the other hand, when the value of the conditional expression (6) is more than the lower limit, it is possible to form the configuration by materials easily available.

Still another aspect of the present invention satisfies the following conditional expression (7), $$1.60 < n2 < 2.10 \quad (7)$$

where n2 is the refractive index of the second lens. The conditional expression (7) is a conditional expression for favorably correcting the chromatic aberration and curvature of field of the entire system of the image pickup lens. When the value of the conditional expression (7) is more than the lower limit, it is possible to maintain the refractive power of the second lens having comparatively large dispersion at an appropriate level and to favorably correct the chromatic aberration and curvature of field. On the other hand, when the value of the conditional expression (7) is less than the upper limit, it is possible to form the configuration by materials easily available.

Still another aspect of the present invention satisfies the following conditional expression (8), $$0.05 < d9/f < 0.25 \quad (8)$$

where d9 is the thickness of the fifth lens on the optical axis and f is the focal length of the entire system of the image pickup lens. The conditional expression (8) is a conditional expression for appropriately setting the thickness of the fifth lens on the optical axis. When the value of the conditional expression (8) is more than the lower limit, the fifth lens is prevented from becoming too thin, and therefore, the formability is not lost. On the other hand, when the value of the conditional expression (8) is less than the upper limit, the fifth lens is prevented from becoming too thick and it is made easy to secure the back focus.

In still another aspect of the present invention, all the lenses image pickup lens are made by a plastic material. By configuring all the lenses by plastic lenses as described above, mass-production of inexpensive lenses even with a small radius of curvature and a small outer diameter is enabled. Further, the press temperature of the plastic lens can be reduced, and therefore, it is possible to suppress the abrasion of the molding die. As a result of that, it is possible to aim at reduction in costs by reducing the number of times of replacement of the molding die and maintenance.

In still another aspect of the present invention, the image pickup lens further has a lens having substantially no power in the image pickup lens described above. That is, the lens configuration of the image pickup lens described above to which a dummy lens having substantially no power is attached is also included in the scope of the application of the present invention.

BRIEF DESCRIPTION OF DRAWINGS

FIG. 5 is a sectional diagram of an image pickup lens of Example 3.

FIG. 7 is a sectional diagram of an image pickup lens of Example 4.

DESCRIPTION OF EMBODIMENTS

Hereinafter, with reference to FIG. 1 etc., an image pickup lens according to an embodiment of the present invention is explained. An image pickup lens 10 illustrated in FIG. 1 has the same configuration as that of an image pickup lens 11 of Example 1, to be described later.

Figure 1:
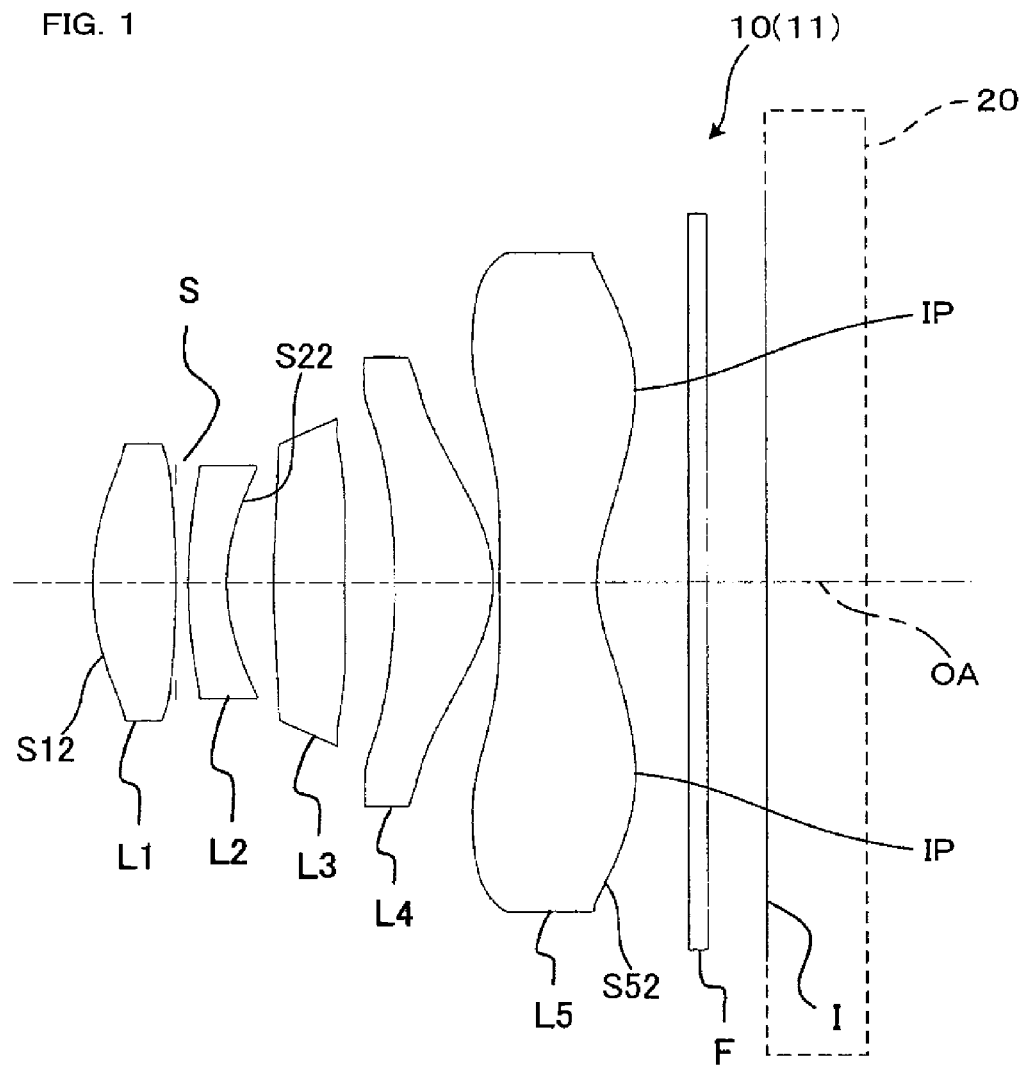
FIG. 1 is a sectional diagram of an image pickup lens according to an embodiment of the present invention, also of an image pickup lens of Example 1.

As shown in FIG. 1, the image pickup lens 10 of the embodiment is for forming an image of a subject on a photoelectric conversion part 20 of a solid-state image sensor and includes, in order from an object side, a first lens L1 having a positive refractive power and having a convex surface directed to the object side, a second lens L2 of a meniscus shape having a negative refractive power and having a concave surface directed to the image side, a third lens L3 having a positive refractive power, a fourth lens L4 having a positive refractive power and having a convex surface directed to the image side, and a fifth lens L5 having a negative refractive power and having a concave surface directed to the image side. Between the first lens L1 and the second lens L2, an aperture stop S is disposed. On the exit side, that is, the image side of the fifth lens L5, a parallel flat plate F and the photoelectric conversion part 20 of the solid-state image sensor are disposed and, on an image-pickup surface I of the photoelectric conversion part 20, an image is formed by the image pickup lens 10.

To explain more specifically, the first lens is a biconvex aspheric lens. The second lens L2 is an aspheric meniscus lens the incidence side, that is, the object side of which is convex and the image side of which is concave. The third lens L3 is an aspheric meniscus lens the object side of which is comparatively moderately convex and the image side of which is slightly concave in the paraxial area. The fourth lens L4 is an aspheric meniscus lens the object side of which is comparatively moderately concave and the image side of which convex. The fifth lens L5 is an aspheric lens the object side of which is comparatively moderately concave and the image side of which is concave in the paraxial area. An image side surface S52 of the fifth lens L5 has an inflection point IP at a position other than the intersection with an optical axis OA. As the parallel flat plate F, an optical low pass filter, IR-cut filter, seal glass of the photoelectric conversion part 20, etc., are supposed.

The image pickup lens 10 described above has a lens configuration of so-called telephoto type and is advantageous in reducing the total length of the image pickup lens 10. Further, by causing the two lenses L2 and L5 of the lenses L1 to L5 in the five-lens configuration to have a negative refractive power, it is made easy to correct the Petzval sum by increasing the number of planes having diverging effect, and therefore, it is possible to secure excellent image quality even on the periphery of the picture plane or image area. Further, by forming the second lens L2 into the shape of a meniscus, it is possible to dispose the composite principal point position of the image pickup lens 10 nearer to the object side and to turn an image side surface S22 of the second lens L2 into a strongly diverging surface, and thereby, the comatic aberration and distortion aberration are corrected effectively. Further, by forming the image side surface S52 of the fifth lens L5 into an aspherical surface, it is possible to favorably correct aberrations on the periphery of the picture plane and by causing the aspheric image side surface S52 of the fifth lens L5 to have the inflection point IP at a position other than the intersection with the optical axis OA, the telecentric characteristics of the image side luminous flux are secured without effort.

The image pickup lens 10 described above satisfies the following conditional expressions (1) and (2), $$-0.8 < f5/f < -0.4 \quad (1)$$

$$0 < d45/f < 0.07 \quad (2)$$

where f5 is the focal length of the fifth lens L5, f is the focal length of the entire system of the image pickup lens, and d45 is an air separation on the optical axis OA between the fourth lens L4 and the fifth lens L5. The conditional expression (1) is a conditional expression for appropriately setting the focal length f5 of the fifth lens L5 and for causing reduction in the total length of the image pickup lens 10 and aberration correction to coexist. As to the conditional expression (2), when the value d45/f is more than the lower limit, the fourth lens L4 and the fifth lens L5 are prevented from coming too close to each other and it is possible to secure a space into which a light blocking member to prevent stray light is to be inserted. On the other hand, when the value d45/f is less than the upper limit, it is possible to dispose the fifth lens L5 nearer to the object side, bringing an advantage in securing the back focus and in correcting the longitudinal chromatic aberration.

More desirably, the image pickup lens 10 satisfies expressions (1') and (2') below, which further limit or restrict the above-mentioned conditional expressions (1) and (2), $$-0.69 < f5/f < -0.45 \quad (1')$$

$$0.01 < d45/f < 0.06 \quad (2')$$

The image pickup lens 10 described above further satisfies the following conditional expression (3), $$0.10 < f/f3 < 0.50 \quad (3)$$

where f3 is the focal length of the third lens L3. The conditional expression (3) is a conditional expression for appropriately setting the focal length f3 of the third lens L3, which is a positive lens, and for causing reduction in the total length of the image pickup lens 10 and aberration correction to coexist. When the value f/f3 of the conditional expression (3) is more than the lower limit, it is possible to maintain the refractive power of the third lens L3 at an appropriate level, bringing an advantage in correcting aberrations. On the other hand, when the value f/f3 of the conditional expression (3) is less than the upper limit, the refractive power of the third lens L3 is prevented from becoming too strong and it is possible to reduce the total length of the image pickup lens 10.

More desirably, the image pickup lens 10 satisfies expression (3') below, which further limits the above-mentioned conditional expression (3), $$0.13 < f/f3 < 0.47 \quad (3')$$

The image pickup lens 10 described above further satisfies the following conditional expression (4), $$0.45 < f34/f < 0.70 \quad (4)$$

where f34 is the composite focal length of the third lens L3 and the fourth lens L4. The conditional expression (4) is a conditional expression for appropriately setting the composite focal length f34 of the third lens L3 and the fourth lens L4 in the range that satisfies the conditional expression (3) described above. When the value f34/f of the conditional expression (4) is more than the lower limit, the composite focal length f34 of the third lens L3 and the fourth lens L4 is prevented from becoming too short and it is possible to dispose the composite principal point position of the image pickup lens 10 nearer to the object side, and therefore, it is possible to reduce the total length of the image pickup lens 10. Further, it is possible to suppress small the comatic aberration and curvature of field that is caused by the fourth lens L4. On the other hand, when the value f34/f of the conditional expression (4) is less than the upper limit, it is possible to maintain the composite refractive power of the third lens L3 and the fourth lens L4 at an appropriate level and it is made possible to smoothly guide the peripheral rays deflected toward the peripheral side so as to escape from the optical axis OA by the second lens L2 to the fifth lens L5, and therefore, the image side telecentric characteristics are secured without effort.

More desirably, the image pickup lens 10 satisfies expressions (4') below, which further limits above-mentioned conditional expression (4), $$0.50 < f34/f < 0.67 \quad (4')$$

The image pickup lens 10 described above further satisfies the following conditional expression (5), $$-2.5 < f23/f < -1.3 \quad (5)$$

where f23 is the composite focal length of the second lens L2 and the third lens L3. The conditional expression (5) is a conditional expression for appropriately setting the composite focal length f23 of the second lens L2 and the third lens L3. When the value f23/f of the conditional expression (5) is less than the upper limit, the negative composite focal length f23 of the second lens L2 and the third lens L3 is prevented from becoming too short less than necessary and it is possible to dispose the composite principal point position of the image pickup lens 10 nearer to the object side, and therefore, it is possible to reduce the total length of the image pickup lens 10. On the other hand, when the value f23/f of the conditional expression (5) is more than the lower limit, it is possible to maintain the negative composite refractive power of the second lens L2 and the third lens L3 at an appropriate level and to appropriately correct the chromatic aberration by the negative second lens L2 and the positive third lens L3.

More desirably, the image pickup lens 10 satisfies expression (5') below, which further limits the above-mentioned conditional expression (5), $$-2.3 < f23/f < -1.5 \tag{5'}$$

The aperture stop S of the image pickup lens 10 is disposed between the first lens L1 and the second lens L2. In this case, the angle of refraction of the marginal rim ray that passes through an object side surface S12 of the first lens L1 is prevented from becoming too large and it is possible to cause downsizing of the image pickup lens 10 and excellent aberration correction to coexist.

In the image pickup lens 10 described above, the image side surface S22 of the second lens L2 has an aspheric shape with which the negative refractive power is reduced at a position more distant from the optical axis OA toward the periphery. In this case, the ray is no longer deflected excessively toward the peripheral side and it is possible to secure excellent telecentric characteristics on the periphery after favorably correcting off-axis aberrations.

The image pickup lens 10 described above further satisfies the following conditional expression (6), $$15 < v2 < 31 \tag{6}$$

where v2 is the Abbe number of the second lens L2. The conditional expression (6) is a conditional expression for appropriately setting the Abbe number v2 of the second lens L2. When the Abbe number v2 of the conditional expression (6) is more than the lower limit, it is possible to appropriately increase dispersion of the second lens L2 and to favorably correct chromatic aberrations, such as the longitudinal chromatic aberration and chromatic aberration of magnification, while suppressing the refractive power of the second lens L2. On the other hand, when the Abbe number v2 of the conditional expression (6) is less than the upper limit, it is possible to form the configuration by materials easily available.

More desirably, the image pickup lens 10 satisfies expression (6') below, which further limits the above-mentioned conditional expression (6), $$15 < v2 < 24 \tag{6'}$$

The image pickup lens 10 described above further satisfies the following conditional expression (7), $$1.60 < n2 < 2.10 \tag{7}$$

where n2 is the refractive index of the second lens L2. The conditional expression (7) is a conditional expression for favorably correcting the chromatic aberration and curvature of field of the entire system of the image pickup lens 10. When the refractive index n2 of the conditional expression (7) is more than the lower limit, it is possible to maintain the refractive power of the second lens L2 having comparatively large dispersion at an appropriate level and to favorably correct the chromatic aberration and curvature of field. On the other hand, when the refractive index n2 of the conditional expression (7) is less than the upper limit, it is possible to form the configuration by materials easily available.

More desirably, the image pickup lens 10 satisfies expression (7') below, which further limits the above-mentioned conditional expression (7)

$$1.63 < n2 < 2.00 \tag{7'}$$

The image pickup lens 10 described above further satisfies the following conditional expression (8), $$0.05 < d9/f < 0.25 \tag{8}$$

where d9 is the thickness of the fifth lens L5 on the optical axis OA. The conditional expression (8) is a conditional expression for appropriately setting the thickness of the fifth lens on the optical axis OA. When the value d9/f of the conditional expression (8) is more than the lower limit, the thickness d9/f of the fifth lens L5 is prevented from becoming too small, and therefore, the formability is not lost. On the other hand, when the value d9/f of the conditional expression (8) is less than the upper limit, the thickness d9 of the fifth lens L5 is prevented from becoming too great and it is made easy to secure the back focus.

More desirably, the image pickup lens 10 satisfies expression (8') below, which further limits the above-mentioned conditional expression (8), $$0.10 < d9/f < 0.21 \tag{8'}$$

All the five lenses L1 to L5 configuring the image pickup lens 10 described above are formed of the plastic material. In this case, mass-production of the inexpensive lenses L1 to L5 even with a small radius of curvature and a small outer diameter is enabled. Further, the press temperature of the plastic lens can be reduced, and therefore, it is possible to suppress the abrasion of the molding die and as a result of that, it is possible to aim at reduction in costs by reducing the number of times of replacement and maintenance of the molding die.

EXAMPLES

Hereinafter, specific Examples of the image pickup lens 10 of the present invention are explained. Symbols used in each Example are as follows.
f: Focal length of the entire system of the image pickup lens
fB: Back focus
F: F-number
2Y: Diagonal length of the image pickup surface of the solid-state image sensor
ENTP: Entrance pupil position (distance from the first surface to the entrance pupil position)
EXTP: Exit pupil position (distance from the image pickup surface to the exit pupil position)
H1: Front principal point position (distance from the first surface to the front principal point position)
H2: Back principal point position (distance from the final or rearmost surface to the back principal point position)
R: Radius of curvature
D: Axial surface separation or distance
Nd: Refractive index for d—line of the lens material
vd: Abbe number or constant of the lens material
In each embodiment, the surface whose surface number is followed by "*" is an aspherical surface and the shape of the aspherical surface is represented by "Formula 1" below where the vertex of the surface is taken as the origin, the X axis is in the direction of the optical axis OA, and the height in the direction perpendicular to the optical axis OA is h.

$$X = \frac{h^2/R}{1+\sqrt{1-(1+K)h^2/R^2}} + \sum A_i h^i \qquad \text{[Formula 1]}$$

wherein $A_i$ is the i-th order aspheric coefficient, R is the radius of curvature, and K is the conic constant.

Example 1

General specifications of Example 1 are as follows.
f=3.77 mm
fB=0.3 mm
F=2.22

2Y=5.744 mm
ENTP=0.46 mm
EXTP=−2.61 mm
H1=−0.66 mm
H2=−3.47 mm

Surface data of Example 1 is shown in Table 1 below.

TABLE 1

| Surface No. | R(mm) | D(mm) | Nd | vd | Effective radius(mm) |
|---|---|---|---|---|---|
| 1* | 2.138 | 0.63 | 1.54470 | 56.2 | 1.08 |
| 2* | −8.816 | 0.00 | | | 0.88 |
| 3 (stop) | ∞ | 0.09 | | | 0.78 |
| 4* | 3.378 | 0.30 | 1.63200 | 23.4 | 0.83 |
| 5* | 1.519 | 0.36 | | | 0.90 |
| 6* | 5.455 | 0.55 | 1.54470 | 56.2 | 1.07 |
| 7* | 16.129 | 0.39 | | | 1.28 |
| 8* | −5.461 | 0.74 | 1.54470 | 56.2 | 1.52 |
| 9* | −1.097 | 0.05 | | | 1.75 |
| 10* | 18.556 | 0.74 | 1.54470 | 56.2 | 2.21 |
| 11* | 1.126 | 0.70 | | | 2.57 |
| 12 | ∞ | 0.15 | 1.51630 | 64.1 | 2.85 |
| 13 | ∞ | | | | 2.88 |

Aspheric coefficients

1st surface

K = −0.28388E+00
A4 = −0.11429E−01
A6 = 0.58394E−02
A8 = −0.30635E−01
A10 = 0.25844E−01
A12 = −0.11762E−01
A14 = −0.24890E−02

2nd surface

K = 0.29247E+02
A4 = −0.24343E−01
A6 = 0.16540E+00
A8 = −0.35209E+00
A10 = 0.38420E+00
A12 = −0.26046E+00
A14 = 0.77919E−01

4th surface

K = −0.29353E+02
A4 = −0.58267E−01
A6 = 0.27269E+00
A8 = −0.39392E+00
A10 = 0.22595E+00
A12 = −0.42192E−01
A14 = −0.51043E−03

5th surface

K = −0.55718E+01
A4 = −0.71904E−02
A6 = 0.15580E+00
A8 = −0.14089E+00
A10 = 0.28229E−01
A12 = −0.32553E−01
A14 = 0.38484E−01

6th surface

K = 0.22272E+02
A4 = −0.10217E+00
A6 = −0.13167E−01
A8 = 0.99700E−01
A10 = −0.14042E+00
A12 = 0.12255E+00
A14 = −0.50937E−01

7th surface

K = −0.95653E+02
A4 = −0.61924E−01
A6 = 0.13566E−01
A8 = −0.35274E−01
A10 = 0.20141E−01

TABLE 1-continued

A12 = 0.64892E−02
A14 = −0.31555E−02

8th surface

K = 0.10552E+02
A4 = 0.14950E−01
A6 = 0.82129E−02
A8 = −0.12281E−01
A10 = −0.26695E−02
A12 = 0.44153E−02
A14 = −0.68681E−03

9th surface

K = −0.39323E+01
A4 = −0.70567E−01
A6 = 0.49341E−01
A8 = −0.42386E−02
A10 = −0.20788E−04
A12 = −0.91338E−03
A14 = 0.18678E−03

10th surface

K = 0.79799E+01
A4 = −0.11271E+00
A6 = 0.35926E−01
A8 = −0.81251E−03
A10 = −0.12071E−02
A12 = 0.18687E−03
A14 = −0.80839E−05

11th surface

K = −0.60657E+01
A4 = −0.62302E−01
A6 = 0.18921E−01
A8 = −0.44435E−02
A10 = 0.53983E−03
A12 = −0.23945E−04
A14 = −0.61553E−07

In the above-mentioned Table 1 and in the subsequent representation (surface data in Table etc.), a number expressed as a power of 10 in scientific notation (for example, $2.5 \times 10^{-02}$) is represented as (for example, 2.5 E-02) using symbol E.

Single lens data of Example 1 is shown in Table 2 below.

TABLE 2

Single lens data

| Lens | First surface | Focal length (mm) |
|---|---|---|
| 1 | 1 | 3.224 |
| 2 | 4 | −4.656 |
| 3 | 6 | 14.863 |
| 4 | 8 | 2.380 |
| 5 | 10 | −2.234 |

FIG. 1 is a sectional diagram of an image pickup lens 11 of Example 1. That is, the image pickup lens 11 includes the first lens L1, the second lens L2, the third lens L3, the fourth lens L4, and the fifth lens L5. All the lenses L1 to L5 are formed of the plastic materials. Between the first lens L1 and the second lens 12, the aperture stop S is disposed, and between the fifth lens L5 and the image pickup surface I, the parallel flat plate F is disposed.

Figure 2A:
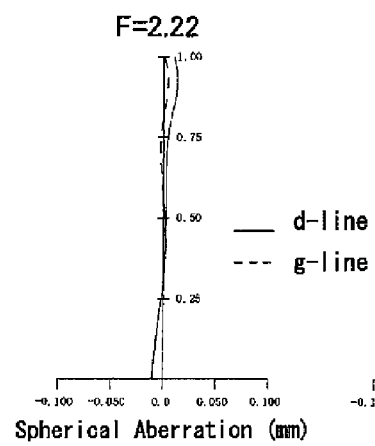
FIG. 2A to FIG. 2E are aberration diagrams of the image pickup lens of Example 1.
Figure 2B:
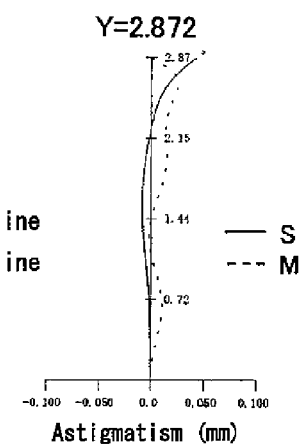
Figure 2C:
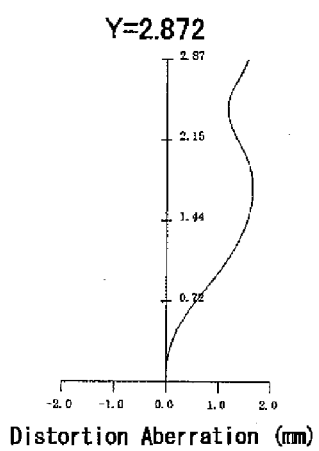
Figure 2D:
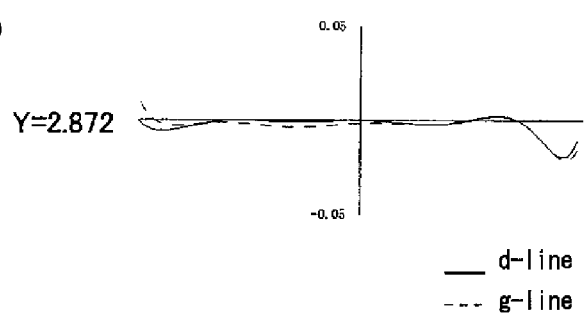
Figure 2E:
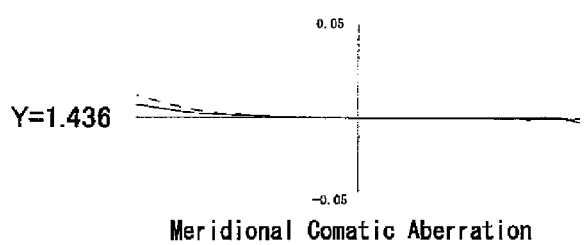

FIG. 2(A) to FIG. 2(C) show aberration diagrams (spherical aberration, astigmatism, distortion aberration) of the image pickup lens 11 of Example 1, and FIG. 2(D) and FIG. 2(E) show the meridional comatic aberration of the image pickup lens 11 of Example 1.

Example 2

General specifications of Example 2 are shown below.
f=3.77 mm
fB=0.32 mm
F=2.22
2Y=5.744 mm
ENTP=0.43 mm
EXTP=−2.66 mm
H1=−0.58 mm
H2=−3.45 mm Surface data of Example 2 is shown in Table 3 below.

TABLE 3

| Surface No. | R(mm) | D(mm) | Nd | νd | Effective radius(mm) |
|---|---|---|---|---|---|
| 1* | 2.121 | 0.64 | 1.54470 | 56.2 | 1.05 |
| 2* | −5.739 | −0.03 | | | 0.87 |
| 3 (stop) | ∞ | 0.12 | | | 0.79 |
| 4* | 5.307 | 0.30 | 1.63200 | 23.4 | 0.84 |
| 5* | 1.627 | 0.35 | | | 0.92 |
| 6* | 7.090 | 0.45 | 1.54470 | 56.2 | 1.06 |
| 7* | −11.804 | 0.48 | | | 1.17 |
| 8* | −2.610 | 0.83 | 1.54470 | 56.2 | 1.46 |
| 9* | −0.922 | 0.05 | | | 1.71 |
| 10* | 9.143 | 0,67 | 1.54470 | 56.2 | 2.11 |
| 11* | 0.931 | 0.70 | | | 2.55 |
| 12 | ∞ | 0.15 | 1.51630 | 64.1 | 2.81 |
| 13 | ∞ | | | | 2.85 |

Aspheric coefficients

1st surface

K = −0.21791E+00
A4 = −0.65950E−02
A6 = −0.25466E−01
A8 = 0.15423E−01
A10 = −0.14478E−01
A12 = −0.58641E−02
A14 = −0.12670E−02

2nd surface

K = −0.39708E+02
A4 = 0.23121E−01
A6 = −0.44634E−01
A8 = 0.73042E−03
A10 = −0.27127E−01
A12 = −0.22920E−03
A14 = 0.15468E−01

4th surface

K = 0.16042E+02
A4 = −0.57659E−01
A6 = 0.10792E+00
A8 = −0.12077E+00
A10 = −0.24132E−01
A12 = 0.43934E−01
A14 = 0.12854E−01

5th surface

K = −0.80429E+01
A4 = 0.62110E−01
A6 = 0.35407E−01
A8 = −0.54300E−01
A10 = 0.13645E−01
A12 = −0.36873E−02
A14 = 0.10861E−01

6th surface

K = −0.37374E+02
A4 = −0.83823E−01
A6 = −0.18470E−01
A8 = 0.40602E−01
A10 = −0.37188E−02
A12 = 0.16762E−01
A14 = −0.32769E−02

TABLE 3-continued

7th surface

K = 0.50948E+01
A4 = −0.79397E−01
A6 = 0.59294E−02
A8 = −0.16626E−01
A10 = 0.93130E−02
A12 = 0.13501E−01
A14 = −0.56039E−03

8th surface

K = −0.68670E+00
A4 = 0.50662E−02
A6 = −0.82779E−02
A8 = 0.40838E−02
A10 = 0.38471E−03
A12 = 0.10712E−02
A14 = −0.38275E−03

9th surface

K = −0.39349E+01
A4 = −0.78930E−01
A6 = 0.42842E−01
A8 = −0.67838E−02
A10 = 0.56305E−03
A12 = −0.17829E−03
A14 = 0.30831E−05

10th surface

K = 0.15372E+02
A4 = −0.72207E−01
A6 = 0.12438E−01
A8 = −0.28619E−03
A10 = −0.32833E−03
A12 = 0.11252E−03
A14 = −0.13226E−04

11th surface

K = −0.61817E+01
A4 = −0.44582E−01
A6 = 0.11869E−01
A8 = −0.28915E−02
A10 = 0.34277E−03
A12 = −0.13598E−04
A14 = −0.11819E−06

Single lens data of Example 2 is shown in Table 4 below.

TABLE 4

| | Single lens data | |
|---|---|---|
| Lens | First surface | Focal length (mm) |
| 1 | 1 | 2.927 |
| 2 | 4 | −3.834 |
| 3 | 6 | 8.201 |
| 4 | 8 | 2.233 |
| 5 | 10 | −1.959 |

Figure 3:
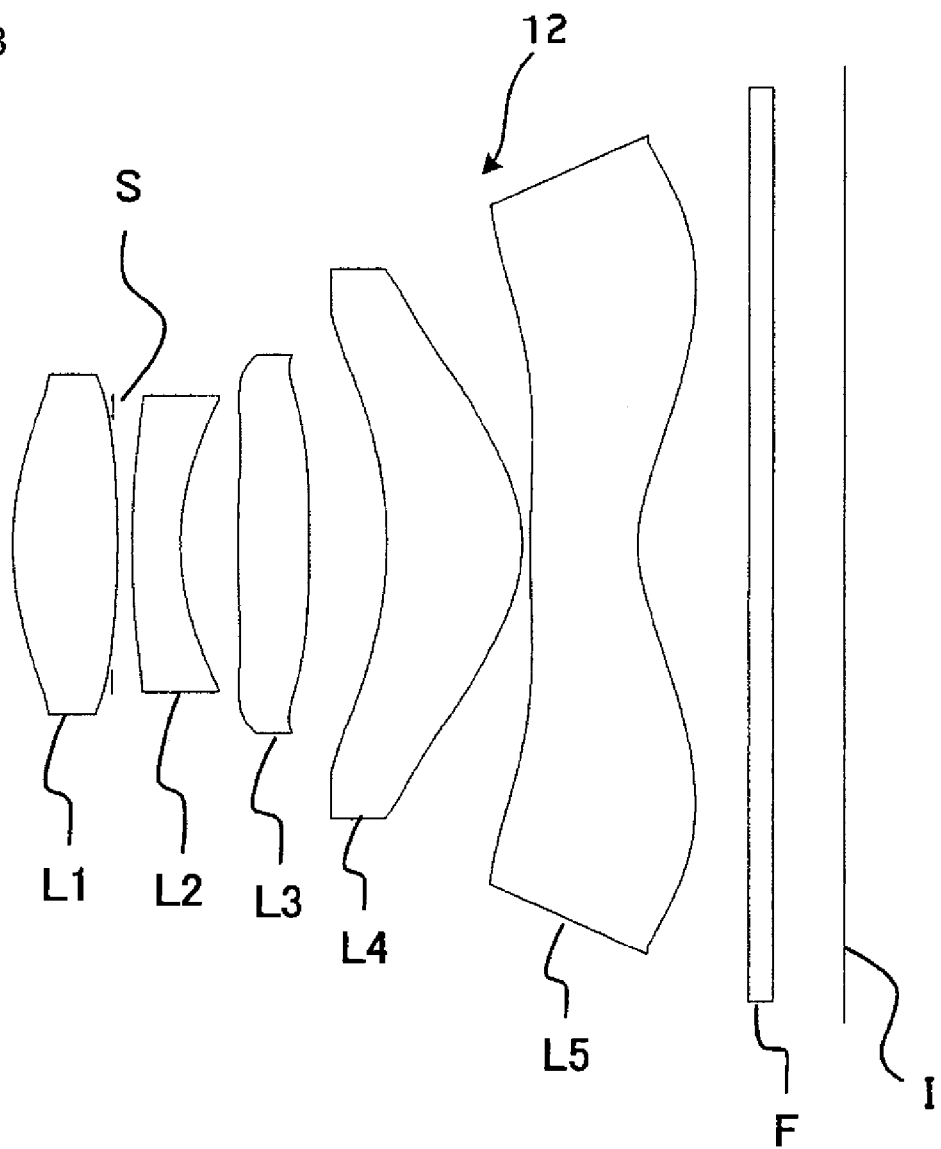
FIG. 3 is a sectional diagram of an image pickup lens of Example 2.

FIG. 3 is a sectional diagram of an image pickup lens 12 of Example 2. The image pickup lens 12 includes the first lens L1, the second lens L2, the third lens L3, the fourth lens L4, and the fifth lens L5. Between the first lens L1 and the second lens L2, the aperture stop S is disposed, and between the fifth lens L5 and the image pickup surface I, the parallel flat plate F is disposed.

Figure 4A:
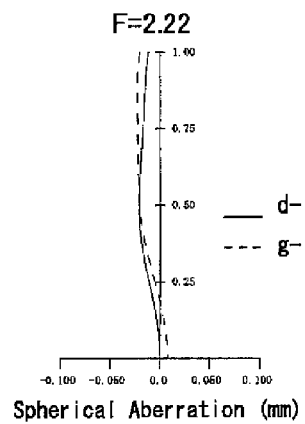
FIG. 4A to FIG. 4E are aberration diagrams of the image pickup lens of Example 2.
Figure 4B:
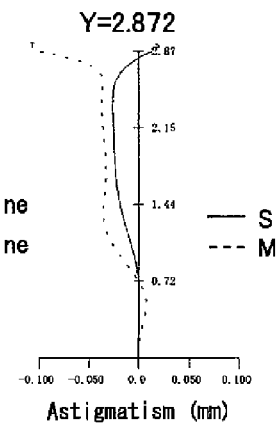
Figure 4C:
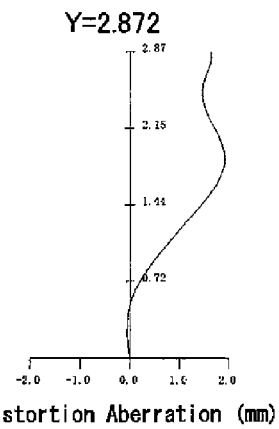
Figure 4D:
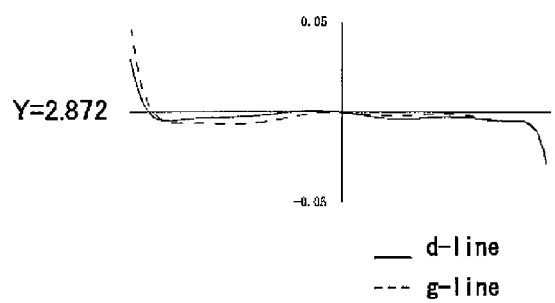
Figure 4E:
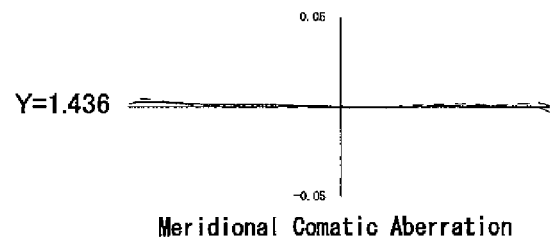

FIG. 4(A) to FIG. 4(C) show aberration diagrams (spherical aberration, astigmatism, distortion aberration) of the image pickup lens 12 of Example 2, and FIG. 4(D) and FIG. 4(E) show the meridional comatic aberration of the image pickup lens 12 of Example 2.

Example 3

General specifications of Example 3 are shown below.
f=3.74 mm
fB=0.29 mm
F=2.26
2Y=5.710 mm
ENTP=0.48 mm
EXTP=−2.59 mm
H1=−0.63 mm
H2=−3.45 mm Surface data of Example 3 is shown in Table 5 below.

TABLE 5

| Surface No. | R(mm) | D(mm) | Nd | νd | Effective radius(mm) |
|---|---|---|---|---|---|
| 1* | 2.058 | 0.65 | 1.54470 | 56.2 | 1.08 |
| 2* | −9.020 | 0.01 | | | 0.89 |
| 3 (stop) | ∞ | 0.09 | | | 0.76 |
| 4* | 3.836 | 0.30 | 1.63200 | 23.4 | 0.80 |
| 5* | 1.586 | 0.37 | | | 0.88 |
| 6* | 5.559 | 0.59 | 1.54470 | 56.2 | 1.09 |
| 7* | 14.763 | 0.33 | | | 1.37 |
| 8* | −5.429 | 0.78 | 1.54470 | 56.2 | 1.59 |
| 9* | −1.083 | 0.05 | | | 1.78 |
| 10* | 11.291 | 0.70 | 1.54470 | 56.2 | 2.31 |
| 11* | 1.068 | 0.69 | | | 2.65 |
| 12 | ∞ | 0.15 | 1.51630 | 64.1 | 2.88 |
| 13 | ∞ | | | | 2.91 |

Aspheric coefficients

1st surface

K = −0.25949E+00
A4 = −0.10133E−01
A6 = −0.73170E−04
A8 = −0.23761E−01
A10 = 0.23962E−01
A12 = −0.14905E−01
A14 = −0.63995E−03

2nd surface

K = 0.34446E+02
A4 = −0.23942E−01
A6 = 0.15587E+00
A8 = −0.34038E+00
A10 = 0.38751E+00
A12 = −0.26947E+00
A14 = 0.80574E−01

4th surface

K = −0.40063E+02
A4 = −0.53867E−01
A6 = 0.27144E+00
A8 = −0.40185E+00
A10 = 0.23184E+00
A12 = −0.69712E−02
A14 = −0.28829E−01

5th surface

K = −0.56465E+01
A4 = −0.36735E−02
A6 = 0.15984E+00
A8 = −0.14018E+00
A10 = 0.26575E−01
A12 = −0.31314E−01
A14 = 0.46107E−01

6th surface

K = 0.22441E+02
A4 = −0.97452E−01
A6 = −0.10596E−01
A8 = 0.95993E−01
A10 = −0.14519E+00
A12 = 0.12204E+00
A14 = −0.47878E−01

TABLE 5-continued

7th surface

K = 0.64043E+02
A4 = −0.60378E−01
A6 = 0.20747E−01
A8 = −0.37375E−01
A10 = 0.17684E−01
A12 = 0.56102E−02
A14 = −0.30805E−02

8th surface

K = 0.94596E+01
A4 = 0.21384E−01
A6 = 0.90748E−02
A8 = −0.12500E−01
A10 = −0.23154E−02
A12 = 0.43863E−02
A14 = −0.78189E−03

9th surface

K = −0.39720E+01
A4 = −0.69429E−01
A6 = 0.47066E−01
A8 = −0.42746E−02
A10 = 0.52099E−05
A12 = −0.89641E−03
A14 = 0.20058E−03

10th surface

K = −0.70721E+02
A4 = −0.11412E+00
A6 = 0.35921E−01
A8 = −0.78558E−03
A10 = −0.11947E−02
A12 = 0.18849E−03
A14 = −0.86671E−05

11th surface

K = −0.58466E+01
A4 = −0.62725E−01
A6 = 0.18667E−01
A8 = −0.43547E−02
A10 = 0.54492E−03
A12 = −0.24359E−04
A14 = −0.18448E−06

Single lens data of Example 3 is shown in Table 6 below.

TABLE 6

Single lens data

| Lens | First surface | Focal length (mm) |
|---|---|---|
| 1 | 1 | 3.141 |
| 2 | 4 | −4.512 |
| 3 | 6 | 16.008 |
| 4 | 8 | 2.336 |
| 5 | 10 | −2.220 |

FIG. 5 is a sectional diagram of an image pickup lens 13 of Example 3. The image pickup lens 13 includes the first lens L1, the second lens L2, the third lens L3, the fourth lens L4, and the fifth lens L5. Between the first lens L1 and the second lens L2, the aperture stop S is disposed and between the fifth lens L5 and the image pickup surface I, the parallel flat plate F is disposed.

Figure 6A:
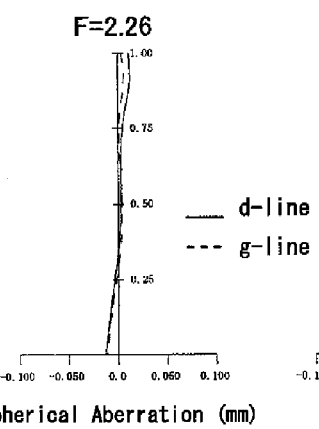
FIG. 6A to FIG. 6E are aberration diagrams of the image pickup lens of Example 3.
Figure 6B:
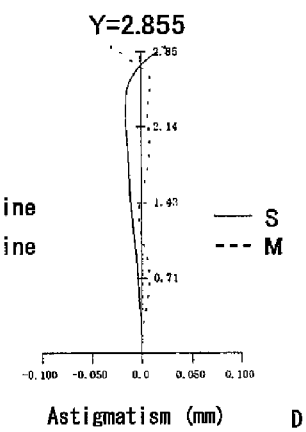
Figure 6C:
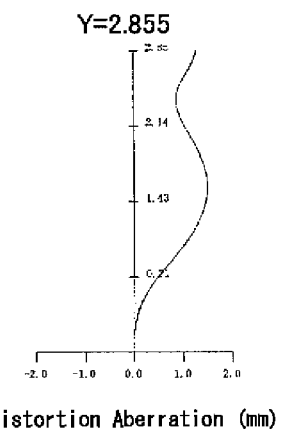
Figure 6D:
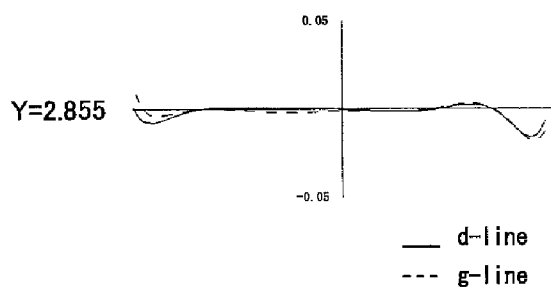
Figure 6E:
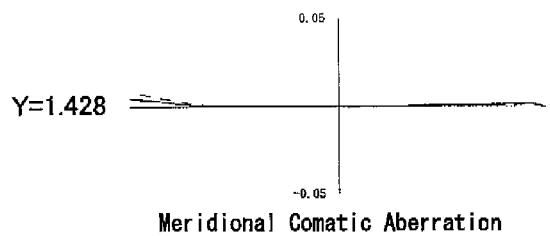

FIG. 6(A) to FIG. 6(C) show aberration diagrams (spherical aberration, astigmatism, distortion aberration) of the image pickup lens 13 of Example 3, and FIG. 6(D) and FIG. 6(E) show the meridional comatic aberration of the image pickup lens 13 of Example 3.

Example 4

General specifications of Example 4 are shown below.
f=3.77 mm
fB=0.28 mm
F=2.22
2Y=5.744 mm
ENTP=0.46 mm
EXTP=−2.62 mm
H1=−0.66 mm
H2=−3.49 mm Surface data of Example 4 is shown in Table 7 below.

TABLE 7

| Surface No. | R(mm) | D(mm) | Nd | νd | Effective radius(mm) |
|---|---|---|---|---|---|
| 1* | 2.122 | 0.64 | 1.54470 | 56.2 | 1.08 |
| 2* | −7.730 | 0.00 | | | 0.89 |
| 3 (stop) | ∞ | 0.10 | | | 0.78 |
| 4* | 4.495 | 0.31 | 1.63200 | 23.4 | 0.83 |
| 5* | 1.652 | 0.37 | | | 0.91 |
| 6* | 5.515 | 0.49 | 1.54470 | 56.2 | 1.09 |
| 7* | 13.607 | 0.36 | | | 1.27 |
| 8* | −5.884 | 0.71 | 1.54470 | 56.2 | 1.53 |
| 9* | −1.209 | 0.23 | | | 1.74 |
| 10* | 12.267 | 0.61 | 1.54470 | 56.2 | 2.39 |
| 11* | 1.236 | 0.70 | | | 2.62 |
| 12 | ∞ | 0.15 | 1.51630 | 64.1 | 2.87 |
| 13 | ∞ | | | | 2.90 |

Aspheric coefficients

1st surface

K = −0.31725E+00
A4 = −0.12394E−01
A6 = 0.74739E−02
A8 = −0.29243E−01
A10 = 0.26319E−01
A12 = −0.12071E−01
A14 = −0.23915E−02

2nd surface

K = 0.16733E+02
A4 = −0.20086E−01
A6 = 0.16636E+00
A8 = −0.35029E+00
A10 = 0.38715E+00
A12 = −0.26542E+00
A14 = 0.77919E−01

4th surface

K = −0.46650E+02
A4 = −0.61165E−01
A6 = 0.27466E+00
A8 = −0.39131E+00
A10 = 0.22921E+00
A12 = −0.47282E−01
A14 = −0.51050E−03

5th surface

K = −0.58983E+01
A4 = −0.98546E−02
A6 = 0.15406E+00
A8 = −0.13851E+00
A10 = 0.34136E−01
A12 = −0.29114E−01
A14 = 0.30230E−01

6th surface

K = 0.22043E+02
A4 = −0.10774E+00
A6 = −0.17380E−01
A8 = 0.99073E−01
A10 = −0.13854E+00
A12 = 0.12434E+00
A14 = −0.49375E−01

TABLE 7-continued

7th surface

K = −0.30933E+02
A4 = −0.64265E−01
A6 = 0.80931E−02
A8 = −0.36874E−01
A10 = 0.19914E−01
A12 = 0.67835E−02
A14 = −0.27042E−02

8th surface

K = 0.12635E+02
A4 = 0.22267E−01
A6 = 0.75100E−02
A8 = −0.13273E−01
A10 = −0.28641E−02
A12 = 0.44790E−02
A14 = −0.62814E−03

9th surface

K = −0.41238E+01
A4 = −0.70265E−01
A6 = 0.49402E−01
A8 = −0.42530E−02
A10 = −0.61681E−04
A12 = −0.91504E−03
A14 = 0.19981E−03

10th surface

K = −0.12124E+03
A4 = −0.11769E+00
A6 = 0.36199E−01
A8 = −0.67601E−03
A10 = −0.11871E−02
A12 = 0.18729E−03
A14 = −0.88620E−05

11th surface

K = −0.59879E+01
A4 = −0.67317E−01
A6 = 0.19737E−01
A8 = −0.44166E−02
A10 = 0.53609E−03
A12 = −0.24301E−04
A14 = −0.60040E−08

Single lens data of Example 4 is shown in Table 8 below.

TABLE 8

Single lens data

| Lens | First surface | Focal length (mm) |
|---|---|---|
| 1 | 1 | 3.129 |
| 2 | 4 | −4.316 |
| 3 | 6 | 16.666 |
| 4 | 8 | 2.652 |
| 5 | 10 | −2.574 |

FIG. 7 is a sectional diagram of an image pickup lens 14 of Example 4. The image pickup lens 14 includes the first lens L1, the second lens L2, the third lens L3, the fourth lens L4, and the fifth lens L5. Between the first lens L1 and the second lens L2, the aperture stop S is disposed, and between the fifth lens L5 and the image pickup surface I, the parallel flat plate F is disposed.

Figure 8A:
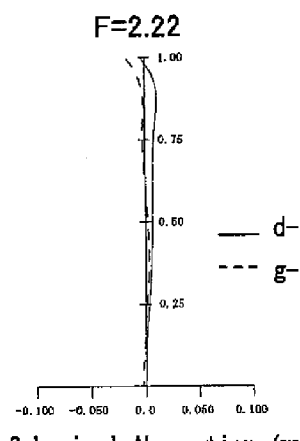
FIG. 8A to FIG. 8E are aberration diagrams of the image pickup lens of Example 4.
Figure 8B:
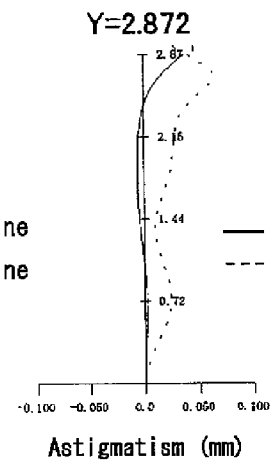
Figure 8C:
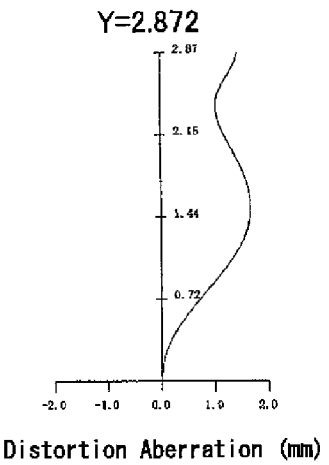
Figure 8D:
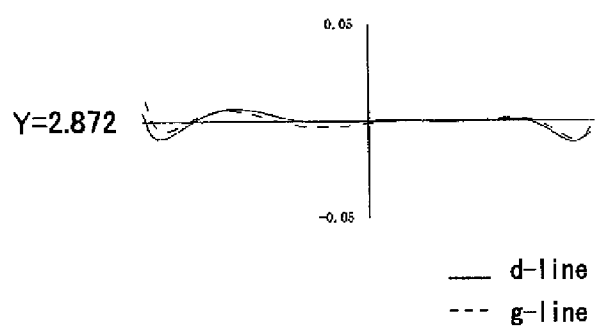
Figure 8E:
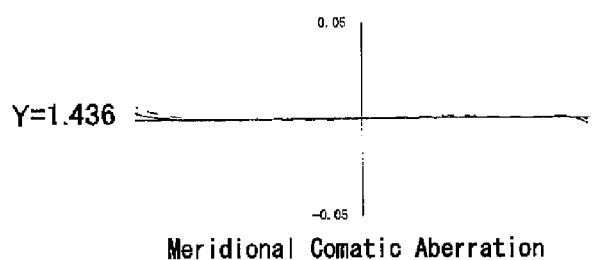

FIG. 8(A) to FIG. 8(C) show aberration diagrams (spherical aberration, astigmatism, distortion aberration) of the image pickup lens 14 of Example 4 and FIG. 8(D) and FIG. 8(E) show the meridional comatic aberration of the image pickup lens 14 of Example 4.

Example 5

General specifications of Example 5 are shown below.
f=3.77 mm
fB=0.3 mm
F=2.22
2Y=5.744 mm
ENTP=0.48 mm
EXTP=−2.65 mm
H1=−0.57 mm
H2=−3.47 mm Surface data of Example 5 is shown in Table 9 below.

TABLE 9

| Surface No. | R(mm) | D(mm) | Nd | vd | Effective radius(mm) |
|---|---|---|---|---|---|
| 1* | 2.085 | 0.64 | 1.54470 | 56.2 | 1.08 |
| 2* | −10.219 | 0.01 | | | 0.88 |
| 3 (stop) | ∞ | 0.07 | | | 0.78 |
| 4* | 3.857 | 0.30 | 1.63200 | 23.4 | 0.82 |
| 5* | 1.655 | 0.38 | | | 0.89 |
| 6* | 5.942 | 0.52 | 1.54470 | 56.2 | 1.06 |
| 7* | 9.652 | 0.35 | | | 1.29 |
| 8* | −7.456 | 0.77 | 1.54470 | 56.2 | 1.52 |
| 9* | −1.124 | 0.14 | | | 1.73 |
| 10* | 16.560 | 0.63 | 1.54470 | 56.2 | 2.21 |
| 11* | 1.156 | 0.72 | | | 2.56 |
| 12 | ∞ | 0.15 | 1.51630 | 64.1 | 2.84 |
| 13 | ∞ | | | | 2.88 |

Aspheric coefficients

1st surface

K = −0.20171E+00
A4 = −0.10182E−01
A6 = 0.73589E−02
A8 = −0.29602E−01
A10 = 0.26709E−01
A12 = −0.11603E−01
A14 = −0.26650E−02

2nd surface

K = 0.24247E+02
A4 = −0.23111E−01
A6 = 0.16647E+00
A8 = −0.35087E+00
A10 = 0.38395E+00
A12 = −0.26274E+00
A14 = 0.77919E−01

4th surface

K = −0.33357E+02
A4 = −0.55956E−01
A6 = 0.27455E+00
A8 = −0.39361E+00
A10 = 0.23883E+00
A12 = −0.61717E−01
A14 = −0.51043E−03

5th surface

K = −0.56556E+01
A4 = −0.98992E−02
A6 = 0.15682E+00
A8 = −0.13412E+00
A10 = 0.31310E−01
A12 = −0.41409E−01
A14 = 0.38484E−01

6th surface

K = 0.22780E+02
A4 = −0.10676E+00
A6 = −0.14922E−01
A8 = 0.10035E+00
A10 = −0.13899E+00
A12 = 0.12376E+00
A14 = −0.49504E−01

TABLE 9-continued

7th surface

K = −0.22113E+02
A4 = −0.62726E−01
A6 = 0.10614E−01
A8 = −0.36956E−01
A10 = 0.19366E−01
A12 = 0.62659E−02
A14 = −0.31822E−02

8th surface

K = 0.14002E+02
A4 = 0.17497E−01
A6 = 0.66989E−02
A8 = −0.13076E−01
A10 = −0.29327E−02
A12 = 0.43212E−02
A14 = −0.73770E−03

9th surface

K = −0.41082E+01
A4 = −0.73354E−01
A6 = 0.49499E−01
A8 = −0.41926E−02
A10 = −0.24498E−04
A12 = −0.91090E−03
A14 = 0.19191E−03

10th surface

K = −0.18271E+03
A4 = −0.11484E+00
A6 = 0.36021E−01
A8 = −0.75387E−03
A10 = −0.11980E−02
A12 = 0.18709E−03
A14 = −0.84573E−05

11th surface

K = −0.62172E+01
A4 = −0.65369E−01
A6 = 0.19570E−01
A8 = −0.44415E−02
A10 = 0.53595E−03
A12 = −0.24226E−04
A14 = −0.56808E−07

Single lens data of Example 5 is shown in Table 10 below.

TABLE 10

Single lens data

| Lens | First surface | Focal length (mm) |
|---|---|---|
| 1 | 1 | 3.239 |
| 2 | 4 | −4.841 |
| 3 | 6 | 27.040 |
| 4 | 8 | 2.331 |
| 5 | 10 | −2.316 |

Figure 9:
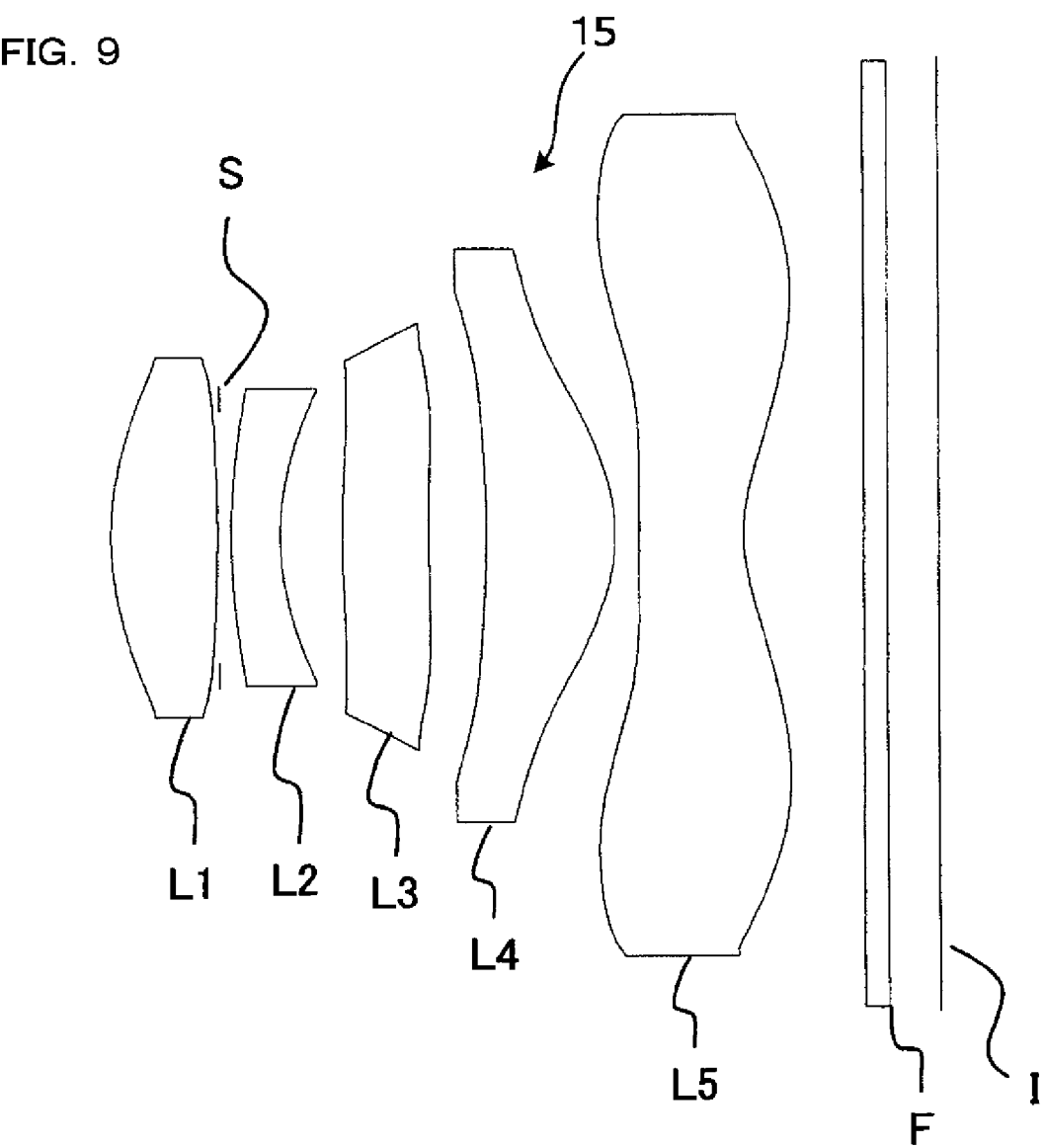
FIG. 9 is a sectional diagram of an image pickup lens of Example 5.

FIG. 9 is a sectional diagram of an image pickup lens 15 of Example 5. The image pickup lens 15 includes the first lens L1, the second lens L2, the third lens L3, the fourth lens L4, and the fifth lens L5. Between the first lens L1 and the second lens L2, the aperture stop S is disposed, and between the fifth lens L5 and the image pickup surface I, the parallel flat plate F is disposed.

Figure 10A:
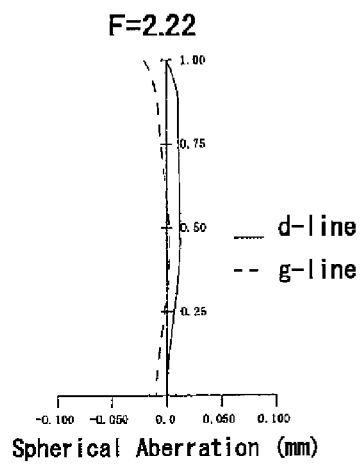
FIG. 10A to FIG. 10E are aberration diagrams of the image pickup lens of Example 5.
Figure 10B:
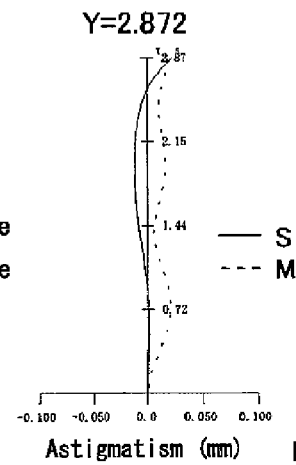
Figure 10C:
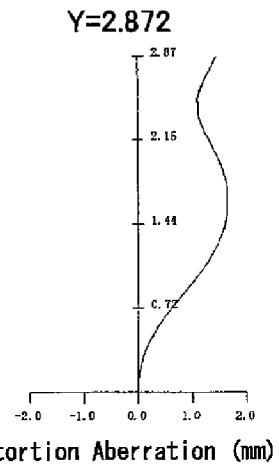
Figure 10D:
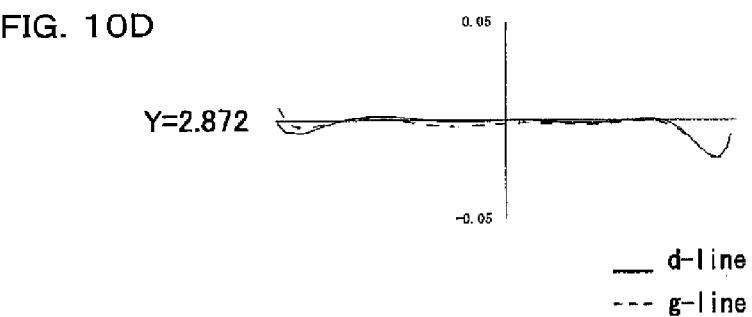
Figure 10E:
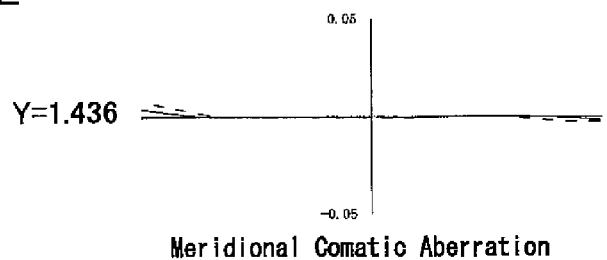

FIG. 10(A) to FIG. 10(C) show aberration diagrams (spherical aberration, astigmatism, distortion aberration) of the image pickup lens 15 of Example 5, and FIG. 10(D) and FIG. 10(E) show the meridional comatic aberration of the image pickup lens 15 of Example 5.

Example 6

General specifications of Example 6 are shown below.
f=3.77 mm
fB=0.29 mm
F=2.22
2Y=5.744 mm
ENTP=0.49 mm
EXTP=−2.55 mm
H1=−0.76 mm
H2=−3.49 mm Surface data of Example 6 is shown in Table 11 below.

TABLE 11

| Surface No. | R(mm) | D(mm) | Nd | vd | Effective radius(mm) |
|---|---|---|---|---|---|
| 1* | 2.137 | 0.65 | 1.54470 | 56.2 | 1.09 |
| 2* | −11.447 | 0.02 | | | 0.88 |
| 3 (stop) | ∞ | 0.08 | | | 0.78 |
| 4* | 3.283 | 0.30 | 1.63200 | 23.4 | 0.83 |
| 5* | 1.559 | 0.36 | | | 0.90 |
| 6* | 5.478 | 0.53 | 1.54470 | 56.2 | 1.08 |
| 7* | 24.978 | 0.41 | | | 1.25 |
| 8* | −5.121 | 0.73 | 1.54470 | 56.2 | 1.53 |
| 9* | −0.971 | 0.09 | | | 1.78 |
| 10* | −28.553 | 0.62 | 1.54470 | 56.2 | 3.26 |
| 11* | 1.050 | 0.71 | | | 2.97 |
| 12 | ∞ | 0.15 | 1.51630 | 64.1 | 3.00 |
| 13 | ∞ | | | | 3.00 |

Aspheric coefficients

1st surface

K = −0.22165E+00
A4 = −0.10859E−01
A6 = 0.89456E−02
A8 = −0.29297E−01
A10 = 0.26080E−01
A12 = −0.11593E−01
A14 = −0.12157E−02

2nd surface

K = 0.40843E+02
A4 = −0.27912E−01
A6 = 0.16894E+00
A8 = −0.34707E+00
A10 = 0.38769E+00
A12 = −0.26521E+00
A14 = 0.77919E−01

4th surface

K = −0.27317E+02
A4 = −0.57059E−01
A6 = 0.27224E+00
A8 = −0.39357E+00
A10 = 0.22796E+00
A12 = −0.41411E−01
A14 = −0.51043E−03

5th surface

K = −0.55483E+01
A4 = −0.11223E−01
A6 = 0.15228E+00
A8 = −0.13814E+00
A10 = 0.33879E−01
A12 = −0.35950E−01
A14 = 0.38885E−01

6th surface

K = 0.22326E+02
A4 = −0.99043E−01
A6 = −0.16250E−01
A8 = 0.98872E−01
A10 = −0.13905E+00
A12 = 0.12398E+00
A14 = −0.49538E−01

TABLE 11-continued

7th surface

K = 0.14241E+02
A4 = −0.61996E−01
A6 = 0.91952E−02
A8 = −0.35324E−01
A10 = 0.20952E−01
A12 = 0.71321E−02
A14 = −0.27123E−02

8th surface

K = 0.95938E+01
A4 = 0.14278E−01
A6 = 0.74193E−02
A8 = −0.12920E−01
A10 = −0.27437E−02
A12 = 0.45354E−02
A14 = −0.57718E−03

9th surface

K = −0.40406E+01
A4 = −0.73266E−01
A6 = 0.49300E−01
A8 = −0.40822E−02
A10 = 0.14848E−04
A12 = −0.90735E−03
A14 = 0.18854E−03

10th surface

K = −0.47323E+04
A4 = −0.11085E+00
A6 = 0.36082E−01
A8 = −0.78109E−03
A10 = −0.12033E−02
A12 = 0.18676E−03
A14 = −0.82517E−05

11th surface

K = −0.70991E+01
A4 = −0.65281E−01
A6 = 0.19294E−01
A8 = −0.44638E−02
A10 = 0.53700E−03
A12 = −0.24007E−04
A14 = 0.26075E−07

Single lens data of Example 6 is shown in Table 12 below.

TABLE 12

Single lens data

| Lens | First surface | Focal length (mm) |
|---|---|---|
| 1 | 1 | 3.362 |
| 2 | 4 | −5.036 |
| 3 | 6 | 12.759 |
| 4 | 8 | 2.073 |
| 5 | 10 | −1.845 |

Figure 11:
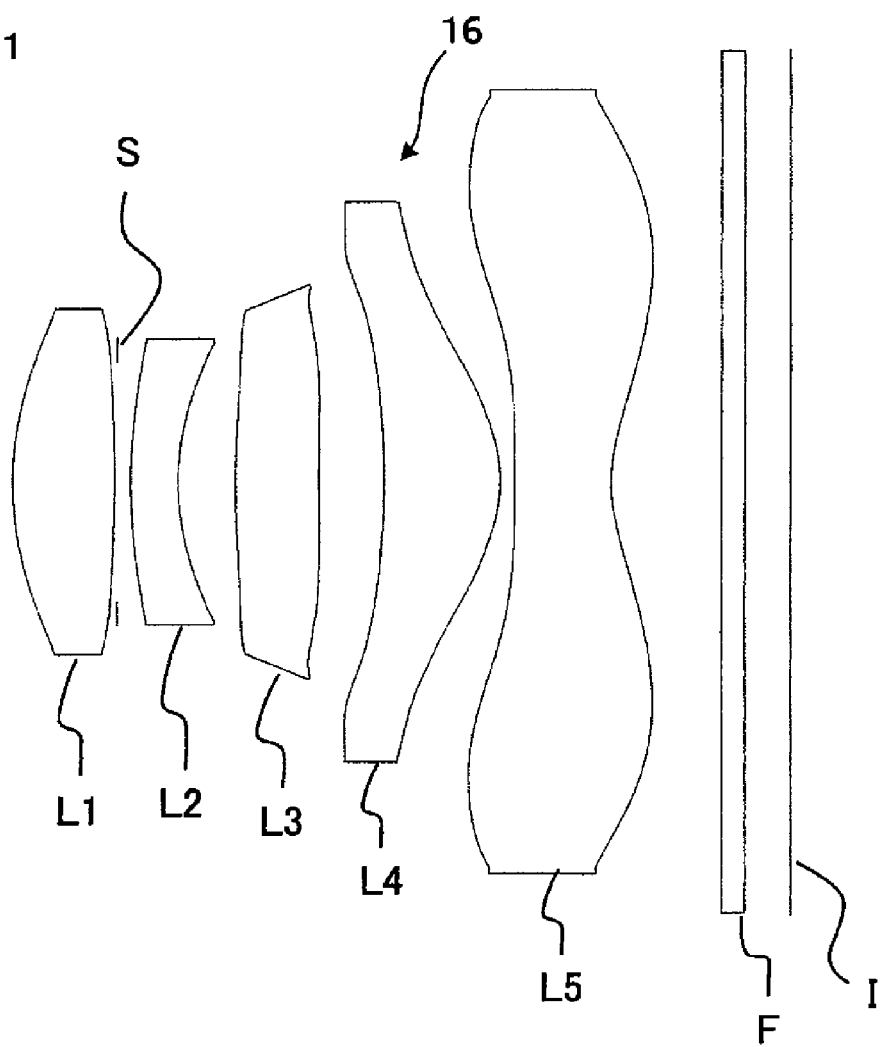
FIG. 11 is a sectional diagram of an image pickup lens of Example 6.

FIG. 11 is a sectional diagram of an image pickup lens 16 of Example 6. The image pickup lens 16 includes the first lens L1, the second lens L2, the third lens L3, the fourth lens L4, and the fifth lens L5. Between the first lens L1 and the second lens L2, the aperture stop S is disposed, and between the fifth lens L5 and the image pickup surface I, the parallel flat plate F is disposed.

Figure 12A:
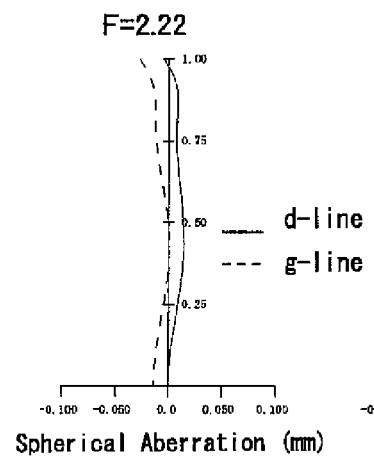
FIG. 12A to FIG. 12E are aberration diagrams of the image pickup lens of Example 6.
Figure 12B:
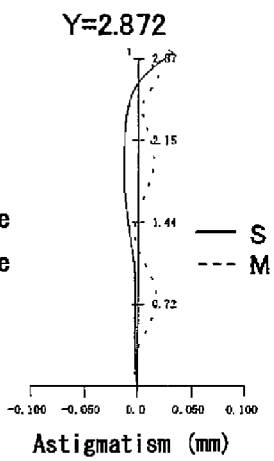
Figure 12C:
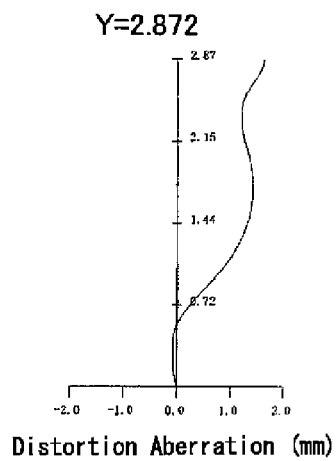
Figure 12D:
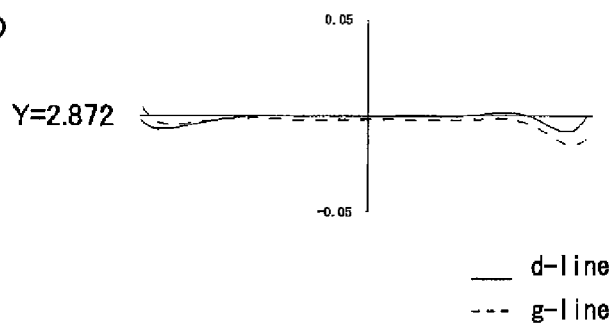
Figure 12E:
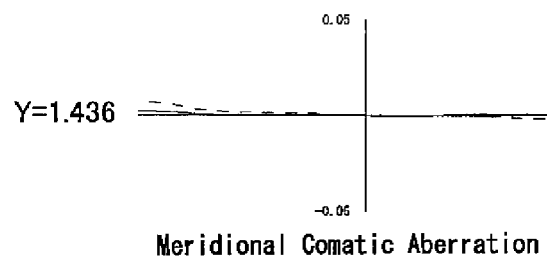

FIG. 12(A) to FIG. 12(C) show aberration diagrams (spherical aberration, astigmatism, distortion aberration) of the image pickup lens 16 of Example 6, and FIG. 12(D) and FIG. 12(E) show the meridional comatic aberration of the image pickup lens 16 of Example 6.

In Table 13 below, the values of each of Examples 1 to 6 corresponding to each of the conditional expressions (1) to (9) are summarized for reference.

TABLE 13

| Conditional expressions | | Example 1 | Example 2 | Example 3 | Example 4 | Example 5 | Example 6 |
|---|---|---|---|---|---|---|---|
| (1) | f5/f | −0.59 | −0.52 | −0.59 | −0.68 | −0.61 | −0.49 |
| (2) | d45/f | 0.013 | 0.013 | 0.013 | 0.062 | 0.038 | 0.025 |
| (3) | f/f3 | 0.25 | 0.46 | 0.23 | 0.23 | 0.14 | 0.30 |
| (4) | f34/f | 0.59 | 0.54 | 0.59 | 0.66 | 0.61 | 0.52 |
| (5) | f23/f | −1.80 | −2.09 | −1.68 | −1.55 | −1.54 | −2.23 |
| (6) | v2 | 23.40 | 23.40 | 23.40 | 23.40 | 23.40 | 23.40 |
| (7) | n2 | 1.632 | 1.632 | 1.632 | 1.632 | 1.632 | 1.632 |
| (8) | d9/f | 0.20 | 0.18 | 0.19 | 0.16 | 0.17 | 0.16 |
| (9) | L/2Y | 0.85 | 0.85 | 0.85 | 0.84 | 0.85 | 0.84 |

As described above, in the image pickup lens 10 of the embodiment and the image pickup lenses 11 to 16 in each of Examples 1 to 6, all the lenses L1 to L5 are formed of the plastic material. However, in the plastic material, the change in refractive index when temperature changes is large, and therefore, if all the lenses L1 to L5 are configured by plastic lenses, the possibility is raised that the image point position in the entire system of the image pickup lens 10 varies when the ambient temperature changes. In contrast to this, in recent years, it has been found that the change in temperature of the plastic material can be reduced by mixing inorganic fine grains into the plastic material. To explain in detail, in general, when fine grains are mixed into the transparent plastic material, light is scattered and the transmittance is reduced, and therefore, it is difficult to use the plastic material as an optical material, however, it is possible to substantially prevent scattering from occurring by reducing the fine grain size smaller than the wavelength of the transmitted light bead. The refractive index of the plastic material reduces when temperature rises, however, the refractive index of the inorganic fine grain increases when temperature rises. Because of this, it is possible to substantially prevent the change in refractive index from occurring by causing these temperature dependences to cancel out each other. Specifically, by dispersing inorganic fine grains having a maximum length of 20 nanometers or less in the plastic material, which is the base material, the plastic material turns into a plastic material in which the dependence of the refractive index on temperature is very slight. For example, by dispersing fine grains of niobium oxide ($Nb_2O_5$) in acryl, it is possible to reduce the change in refractive index when temperature changes. In the present invention, by using the plastic material in which such inorganic fine grains are dispersed for the first lens L1 having a comparatively large refractive power or for all the lenses L1 to L5, it is made possible to suppress small the variations in the image point position when temperature changes in the entire system of the image pickup lens 10.

Further, in recent years, as a method for mounting image pickup apparatuses at low costs (manufacturing costs) and in a large number, the technique has been proposed, which mounts electronic parts and optical elements at the same time on a substrate by performing reflow processing (heating processing) on the substrate on which solder is potted or placed in advance while leaving IC (integrated circuit) chips and other electronic parts and optical elements thereon so as to melt the solder. When performing such reflow processing, it is necessary to heat both the electronic parts and the optical elements to about 200° C. to 260° C. At such high temperatures, there is such a problem that lenses using a thermoplastic resin deform or discolor and their optical performance is reduced. As one of methods for solving such a problem, a technique has been proposed, which causes downsizing and optical performance in a high temperature environment to coexist by using a glass mold lens excellent in heat-resistant performance. However, the glass mold lens costs more than a lens using a thermoplastic resin, and therefore, there used to be such a problem that the request to reduce costs of the image pickup apparatus cannot be met. Because of the above, the image pickup lens is made so that the optical performance deteriorates less when exposed to high temperature, and is further made more effective in reflow processing compared to a lens using a thermoplastic resin, such as a polycarbonate based or polyolefin based resin and easier to manufacture and less expensive than a glass mold lens, by using an energy curable resin for the material of the image pickup lens. Due to this, it is possible to cause low costs and mass-productivity of the image pickup apparatus incorporating the image pickup lens to coexist. The energy curable resin refers to both the thermosetting resin and the UV-curable resin. It may be possible to form the lenses L1 to L5 configuring the image pickup lens 10 of the present invention by using the energy curable resin described above.

In the above-mentioned embodiment, the angles of incidence of the principal rays that enters the image pickup surface I of the photoelectric conversion part 20 provided in the solid-state image sensor is not necessarily designed to be sufficiently small on the periphery of the image pickup surface I. However, due to the recent technique, it is made possible to reduce shading (uneven luminance) by reviewing the array of the color filters and on-chip microlens arrays provided in the photoelectric conversion part 20. Specifically, if the pitch of the array of the color filters and on-chip microlens arrays is set to a pitch slightly smaller than the pixel pitch of the image pickup surface I of the photoelectric conversion part 20, the color filter and the on-chip microlens array shift more toward the optical axis OA side of the image pickup lens 10 with respect to each pixel on the periphery nearer to the periphery of the image pickup surface I, and therefore, it is possible to effectively guide the obliquely incident ray to the image pickup surface of each pixel. Due to this, it is possible to suppress small the shading that occurs in the photoelectric conversion part 20. The image pickup lenses 11 to 16 of Examples described above are examples of the design aiming at further downsizing according to the above-described requests made less stringent.

Further in the above-mentioned embodiment, the image pickup lenses 11 to 16 of Examples described above are configured by the five lenses L1 to L5, but it is possible to add one or more lenses having substantially no power before and after, or between the lenses L1 to L5.

The invention claimed is:

1. An image pickup lens for forming an image of a subject on a photoelectric conversion part of a solid-state image sensor, consisting of, in order from an object side thereof:

a first lens having a positive refractive power and having a convex surface directed to an object side;

a second lens of a meniscus shape having a negative refractive power and having a concave surface directed to an image side; in order from an object side thereof:

a third lens having a positive refractive power;

a fourth lens having a positive refractive power and having a convex surface directed to the image side; and a fifth lens having a negative refractive power and having a concave surface directed to the image side, wherein an image side surface of the fifth lens has an aspheric shape, has an inflection point at a position other than an intersection with an optical axis, and satisfies the conditional expressions below, $$-0.8 < f5/f < -0.4 \quad (1)$$

$$0 < d45/f < 0.07 \quad (2)$$

$$0.10 < f/f3 < 0.50 \quad (3)$$

where f5 is a focal length of the fifth lens, f is a focal length of an entire system of the image pickup lens, d45 is an air separation on the optical axis between the fourth lens and the fifth lens, and f3 is a focal length of the third lens.

2. The image pickup lens according to claim 1, wherein the image pickup lens satisfies the following conditional expression, $$0.45 < f34/f < 0.70 \quad (4)$$

where f34 is a composite focal length of the third lens and the fourth lens and f is the focal length of the entire system of the image pickup lens.

3. The image pickup lens according to claim 1, wherein the image pickup lens satisfies the following conditional expression, $$-2.5 < f23/f < -1.3 \quad (5)$$

where f23 is a composite focal length of the second lens and the third lens and f is the focal length of the entire system of the image pickup lens.

4. The image pickup lens according to claim 1, wherein an aperture stop of said image pickup lens is disposed between said first lens and said second lens.

5. The image pickup lens according to claim 1, wherein an image side surface of said second lens has an aspheric shape with which the negative refractive power becomes weaker at a position more distant from the optical axis toward a periphery.

6. The image pickup lens according to claim 1, wherein the image pickup lens satisfies the following conditional expression, $$15 < v2 < 31 \quad (6)$$

where v2 is an Abbe number of the second lens.

7. The image pickup lens according to claim 1, wherein the image pickup lens satisfies the following conditional expression, $$1.60 < n2 < 2.10 \quad (7)$$

where n2 is the refractive index of the second lens.

8. The image pickup lens according to claim 1, wherein the image pickup lens satisfies the following conditional expression, $$0.05 < d9/f < 0.25 \quad (8)$$

where d9 is a thickness of the fifth lens on the optical axis and f is the focal length of the entire system of the image pickup lens.

9. The image pickup lens according to claim 1, wherein all lenses of said image pickup lens are formed by plastic material.

10. An image pickup lens for forming an image of a subject on a photoelectric conversion part of a solid-state image sensor, consisting of, in order from an object side thereof:
a first lens having a positive refractive power and having a convex surface directed to an object side;
a second lens of a meniscus shape having a negative refractive power and having a concave surface directed to an image side; in order from an object side thereof:
a third lens having a positive refractive power;
a fourth lens having a positive refractive power and having a convex surface directed to the image side; and
a fifth lens having a negative refractive power and having a concave surface directed to the image side,
wherein an image side surface of the fifth lens has an aspheric shape, has an inflection point at a position other than an intersection with an optical axis, and satisfies the conditional expressions below, $$-0.8 < f5/f < -0.4 \quad (1)$$

$$0 < d45/f < 0.07 \quad (2)$$

$$-2.5 < f23/f < -1.3 \quad (5)$$

where f5 is a focal length of the fifth lens, f is a focal length of an entire system of the image pickup lens, d45 is an air separation on the optical axis between the fourth lens and the fifth lens, and f23 is a composite focal length of the second lens and the third lens.

11. The image pickup lens according to claim 10, wherein an aperture stop of said image pickup lens is disposed between said first lens and said second lens.

12. The image pickup lens according to claim 10, wherein an image side surface of said second lens has an aspheric shape with which the negative refractive power becomes weaker at a position more distant from the optical axis toward a periphery.

13. The image pickup lens according to claim 10, wherein the image pickup lens satisfies the following conditional expression, $$15 < v2 < 31 \quad (6)$$

where v2 is an Abbe number of the second lens.

14. The image pickup lens according to claim 10, wherein the image pickup lens satisfies the following conditional expression, $$1.60 < n2 < 2.10 \quad (7)$$

where n2 is the refractive index of the second lens.

15. The image pickup lens according to claim 10, wherein the image pickup lens satisfies the following conditional expression, $$0.05 < d9/f < 0.25 \quad (8)$$

where d9 is a thickness of the fifth lens on the optical axis and f is the focal length of the entire system of the image pickup lens.

16. The image pickup lens according to claim 10, wherein all lenses of said image pickup lens are formed by plastic material.

* * * * *